United States Patent

Bardonnet et al.

[11] 4,036,760
[45] July 19, 1977

[54] FLUID FRACTIONATING MEMBRANE APPARATUS

[75] Inventors: Claude Bardonnet, Lyon; Robert Brun, Bollene; Michel Pages, St. Martin D'Ardeche, all of France

[73] Assignee: Rhone-Poulenc Industries, Paris, France

[21] Appl. No.: 592,993

[22] Filed: July 3, 1975

[30] Foreign Application Priority Data

July 5, 1974 France .................... 74.23440

[51] Int. Cl.² .................................. B01D 31/00
[52] U.S. Cl. ...................... 210/323 R; 210/433 M; 210/494 M
[58] Field of Search ............... 210/321, 456, 497.1, 210/494, 323 R, 433 M

[56] References Cited

U.S. PATENT DOCUMENTS

| | | | |
|---|---|---|---|
| 2,715,097 | 8/1955 | Guarino | 210/321 |
| 3,784,470 | 1/1974 | Richardson et al. | 210/497.1 X |
| 3,794,468 | 2/1974 | Leonard | 210/497.1 X |
| 3,834,546 | 9/1974 | Brun et al. | 210/321 |

*Primary Examiner*—Frank A. Spear, Jr.
*Attorney, Agent, or Firm*—Stevens, Davis, Miller & Mosher

[57] ABSTRACT

Fluid fractionating membrane apparatus is described in which a jacket is provided with a fluid inlet and a fluid outlet for introducing and extracting a first fluid to and from the jacket, at least one core extending within said jacket. A number of continuous porous tubular membrane support elements, having at least one longitudinal channel connected to the exterior of the jacket, are wound uniformly either spirally or helically around the core and they are each provided with a membrane which covers the exterior surface thereof.

11 Claims, 6 Drawing Figures

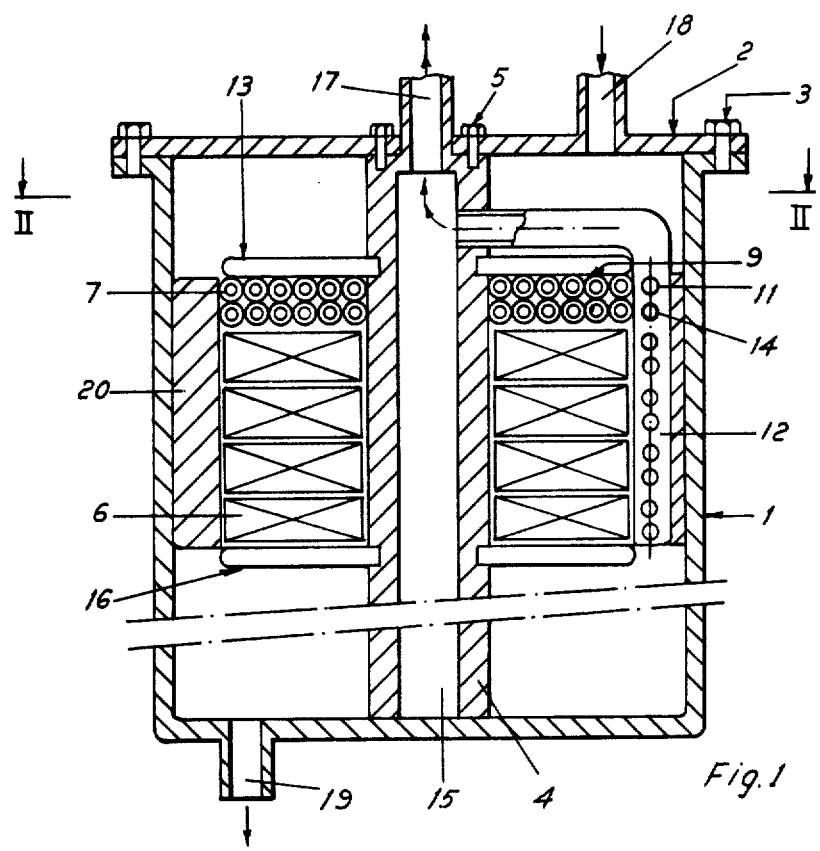
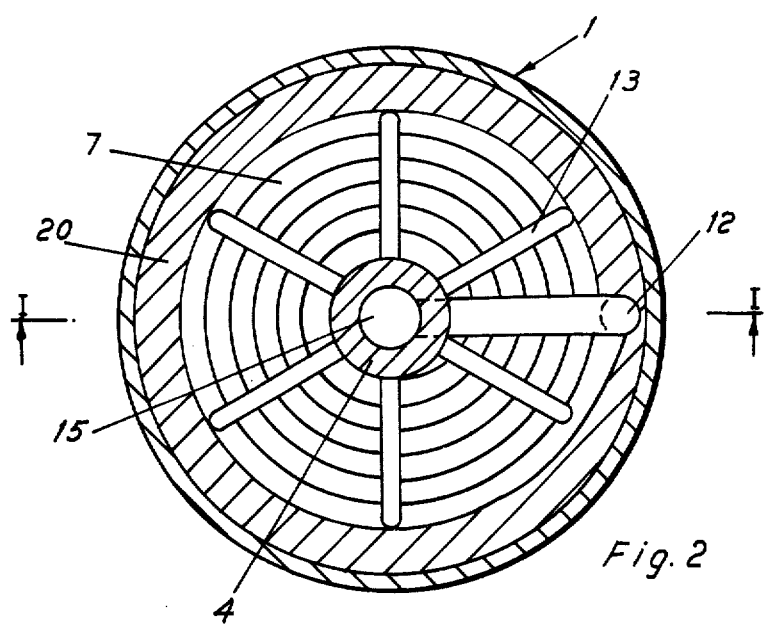

FLUID FRACTIONATING MEMBRANE APPARATUS

The present invention relates to fluid fractionating membrane apparatus having membranes on coiled tubular supports, for the treatment of fluids. Such apparatuses can be used either as devices for effecting exchange between two fluids, or as devices for separating liquid or gaseous fluids, in various applications such as reverse osmosis, ultrafiltration, gas permeation and dialysis.

The compactness of apparatuses with membranes on coiled tubular supports can generally be relatively high and these apparatuses can generally gave hydrodynamic flow conditions which promote fluid exchange reactions. However, in the known apparatuses of this type, the tubular elements are covered internally with a membrane so that the compactness of these apparatuses is not as high as possible and it is not always easy to check the condition of the membranes and to clean them.

According to the present invention we provide fluid fractionating apparatus comprising a jacket having a fluid inlet and a fluid outlet for introducing and extracting a first fluid, at least one core within said jacket, at least one continuous porous tubular membrane support element having at least one longitudinal channel connected to the exterior of the jacket, said support being wound uniformly around said at least one core, a membrane covering said at least one support element externally and means for supplying and/or removing a second fluid to or from said at least one channel.

Such an apparatus can be very compact, enables a flushing fluid to pass through it at a high flow rate, and is suitable for collecting the permeate effectively and for providing good flow conditions for the fluids.

The apparatus can be simple to maintain and makes it possible to check easily the condition of the membranes and to clean them where appropriate.

The invention will be more fully understood from the following description given by way of example, reference being made to the accompanying drawings, in which:

FIG. 1 is a cross-sectional view along an axial plane I—I, in FIG. 2, of a first embodiment of apparatus according to the invention;

FIG. 2 is a cross-section taken along a radial plane II—II of FIG. 1;

Figure 3:
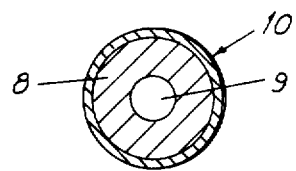
FIG. 3 is a cross-section of a coiled tubular membrane support element used in the apparatus according to the invention.

The apparatus, shown in FIGS. 1 and 2, is a fluid separating apparatus which comprises a jacket consisting of a cylindrical tank 1 and a lid 2 joined together in a leakproof manner by bolts 3 and suitable gaskets. A hollow cylindrical core 4 is positioned inside the jacket, along the axis of the tank, the core being fixed to the tank and/or to the lid by any known means such as bolts 5, gaskets (not shown) providing sealing at its ends. The core acts as a support for several coils, only one of which has been represented for greater clarity.

The coil 6 consists of five identical tubular membrane support elements, four of which are represented diagrammatically by rectangles with their diagonals. Each membrane support element 7 consists of a continuous porous tubular element 8 having an axial longitudinal channel 9 and covered externally with a membrane 10 (see FIG. 3). The membrane is generally formed on its support prior to shaping the latter. At one end the channel opens into an orifice 11 of a manifold 12, the element 7 being connected in a leakproof manner to this manifold, for example by means of an elastomer sleeve. The element 7 is uniformly coiled in a spiral in a radial plane from the core 4 to the manifold 12. For this purpose, this first layer of turns rests on a porous support consisting, for example, of a series of six small radial bars 13 fixed to the core 4. A second layer of turns rests on the first layer, the element 7 being again uniformly coiled in a spiral from the core 4 to the manifold 12 to which its second end is connected in a leakproof manner. The second end of the channel 9 opens into an orifice 14 of the manifold 12.

Thus each membrane support element 7 is coiled in a spiral, its two ends being connected in a leakproof manner to the manifold 12, which opens into a main channel 15 situated inside the core 4. A second series of six small radial bars 16, identical to the small bars 13, holds the elements 7 coiled in spirals, laterally.

The main channel 15 is in communication, via an orifice 17, with the exterior of the apparatus. Moreover, orifices 18 on the lid 2 an 19 on the tank 1 make it possible to introduce a fluid into and/or remove it from the interior of the jacket of the apparatus and make it possible to cause the fluid to flow around the coiled elements 7.

Advantageously, one or more layers 20 of a material which is flexible, elastic and substantially leakproof to fluids, for example a sheet of foam material such as a flexible sheet of expanded polyurethane foam, are positioned around the coils 6, on the inner walls of the tank 1.

This material occupies the space between the coils 6 and the manifold 12, on the one hand, and the jacket of the apparatus, on the other hand. It forces the fluid flowing outside the tubular membrane support elements 7 to seep completely around these elements.

When used, for example, for an operation for effecting separation by reverse osmosis, this apparatus operates in the following way. The solution to be treated enters the apparatus via the orifice 18 and fills the entire available volume of the apparatus. It flows around the membranes and is subjected, by known means, which are not represented, to the desired pressure. Under the effect of this pressure, the solvent passes selectively through the membranes, whilst the solute is retained outside the membranes and is removed via the orifice 19. After the solvent has passed through the membranes and their porous supports 8, it reaches the axial channel 9 along which it travels until it reaches the manifold 12 and then the main channel 15; it is then collected at the orifice 17.

The porous tubular membrane support element can have a cross-section of any shape whatsoever, for example a polygonal or elliptical shape, but it is advantageously circular. This element can be equipped with several longitudinal channels, but it is generally equipped with a single axial channel, the cross-section of which is advantageously homothetic to that of the porous element; it is thus advantageously circular.

The transverse and longitudinal dimensions of the porous tubular membrane support elements can be decided by those skilled in the art in order to make it easy to manufacture and maintain the apparatus. In apparatuses of the type for effecting separation operations, these dimensions will be decided relative to one another in order to permit normal flow of the fluid which has passed through the membrane.

Elements of circular cross-section preferably have external diameters which are generally between 1 to 10 mm. Elements of larger diameters would be less easy to coil in spirals and would especially provide lower compactness (that is to say, a ratio of membrane surface area to volume of apparatus), and elements of smaller diameters would be more difficult to use and would run the risk of becoming clogged.

As porous elements, it is possible to use various materials which are sufficiently strong to support a membrane and at least as permeable to fluids as the membrane which they support. Thus it is possible to use, for example, glass fibres bonded by a resin, or porous or perforated thermoplastic materials. It is also possible to use flexible shaped sections covered, for example, with a helicoidally wound strip of non-woven material. It is, however, preferred to use a woven, braided or knitted textile sheath forming a cord. The cords described in the patent applications published under Nos. FR 2,182,730 and FR 2,194,461 can be used as membrane supports. However, it is preferred to use the flexible hollow cords described in Belgian Pat. No. 814,953. In fact, the latter have a texture which is homogeneous, compact and stabilized by heating right through, enabling them to be wound in uniform turns with radii of curvature of between especially 1 and 10 cm, and to retain substantially circular cross-sections.

The membrane support elements are covered with membranes which are permeable to fluids and which, preferably adhere to their supports. These membranes are most frequently semi-permeable membranes, that is to say membranes which are selectively permeable to fluids. These membranes can be of the homogeneous (or dense) type, of the microporous type, of the anisotropic type (possessing variable porosity or possessing a skin), or of the composite type, that is to say consisting of several layers of different chemical natures. These various types of membranes can be prepared by means of known processes, for example casting a solution and then removing its solvent, most frequently by evaporation or coagulation.

As the membrane, it is possible to use any membrane which, when stored in the dry or wet state, possesses a degree of elongation at break which is sufficient to enable it to follow the minimum radii of curvature imposed on the support element, without itself breaking. For example, membranes based on cellulose acetate as described in French Pat. No. 1,426,548, or ion exchange membranes made of sulphonated polyaryl ether sulphones according to U.S. Pat. No. 3,709,841, can be used for reverse osmosis; membranes made of polyacrylontrile according to Belgian Pat. No. 772,361 or bi-ionic membranes based on complex polyelectrolytes according to the French patent published under No. 2,144,922 can be used for ultrafiltration; and membranes based on silicone elastomers or microporous polyvinyl chloride can be used for gas permeation.

The apparatus according to the invention can be the subject of diverse different variations.

Figure 5:
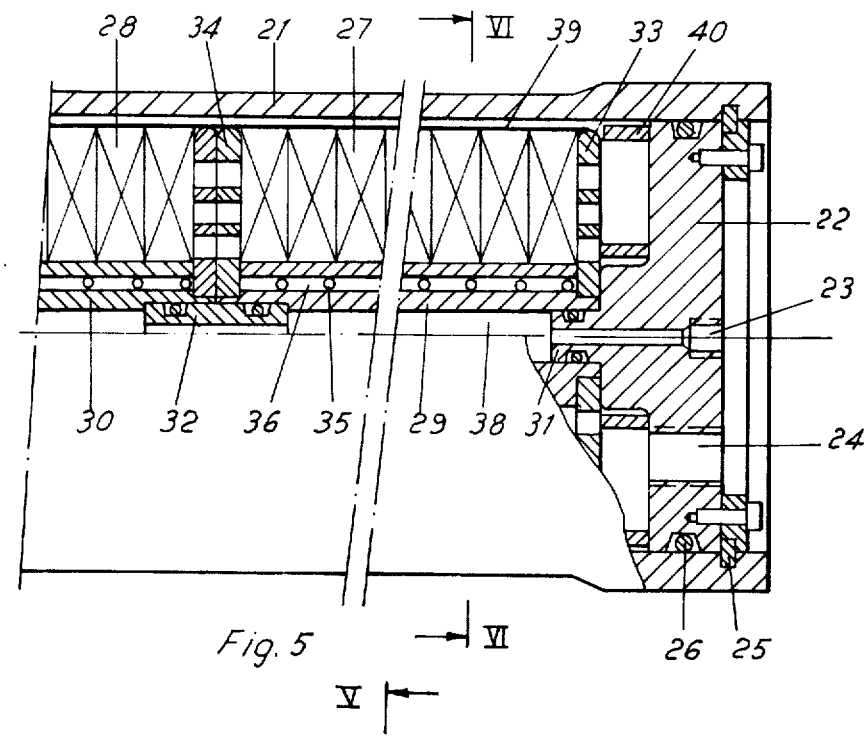
FIG. 5 is a partial cross-sectional view taken along an axial plane V—V of FIG. 6 of a second embodiment of apparatus according to the invention.
Figure 6:
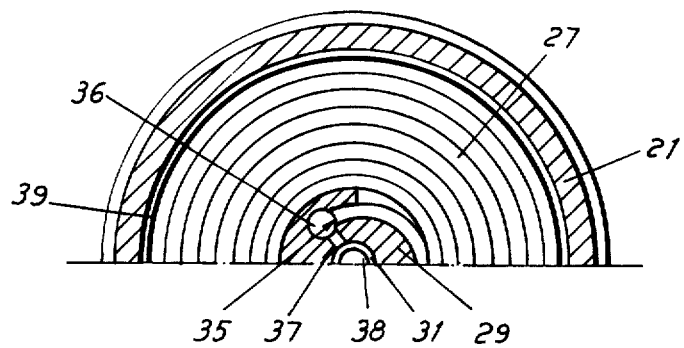
FIG. 6 is a cross-section taken along a radial plane VI—VI of FIG 5.

Thus Figs. 5 and 6 represent another embodiment of an apparatus according to the invention. The cylindrical jacket 21 is closed at each end by identical bases, only one 22 of which is shown, this having an axial orifice 23 and a lateral orifice 24. The base 22 is held in position by a circlip 25 and sealing is provided by a toroidal gasket 26. Coils 27 and 28 similar to the coils 7 are stacked over the entire length of the apparatus. These coils can thus be superposed and removed easily. Their respective cores 29 and 30 are aligned along the axis of the apparatus and centered, firstly, on an inner boss 31 of each base, and, secondly, on sleeves 32 provided with suitable sealing rings.

The tubular membranes are arranged in spirals around the cores 29 and 30 and are held laterally by perforated discs 33 and 34 and at their periphery by a sealing sheath 39. The open ends of the tubular membrane support elements open, via orifices 35, into a manifold 36 connected by channels 37 to a main channel 38 which is in communication, via the orifice 23, with the exterior of the apparatus. A spacer 40 maintains a suitable space between the disc 33 and the base 22 and enables a fluid entering via the orifice 24 to distribute itself around the tubular membranes inside the apparatus.

The fluid which has not passed through the membranes leaves via the orifice similar to the orifice 24 at the opposite end of the apparatus. The fluid which has passed through the membranes flows through the orifices 35 into the manifold 36, the channels 37 and 38 and the orifice 23.

As a variant, each membrane support element may be connected at one end only to the manifold 12 (FIGS. 1 and 2) and the opposite end can be sealed by means of a bung. As a further variant, the manifolds 12 of each coil can be connected together to form a single manifold which opens directly to the exterior of the apparatus. The elements 7 then each connect the main channel 15 to the single manifold 12. The apparatus then has four orifices communicating with the exterior, and this makes it possible to cause two fluids to flow inside the apparatus which can then operate as a device for effecting exchange operations.

As a further variant, the coiling of the tubular membrane support elements around the core 4 in radial planes can be replaced by a helicoidal coiling of these elements, the latter forming concentric layers.

In order to facilitate the flow of a fluid around the tubular membrane support elements, it is possible to keep adjacent elements slightly apart from one another with the help of any known means such as spacers which are preferably thin, flexible and uniformly spaced apart, consisting, for example, of plastic slats, yarns, wide-mesh nets and the like. A spacing of less than 1 mm, maintained at least every 5 cm, gives good results.

It can be of value to surround each coil provided with its tubular membrane support elements with an elastic or preferably heat-shrinkable sheath which may be either impermeable or permeable and consists, in this case, for example, of a net or a woven fabric. This sheath makes it possible to hold the coiled elements in position when the apparatus is being assembled or maintained.

In some cases, it can be advantageous to provide baffles which force the fluid flowing outside the tubular membranes to follow a particular path. It is thus possible to orient the flow sweeping over the membranes and to assign its speed in order to improve the effectiveness of the exchange reactions at the level of the membranes.

Thus it is possible to position baffles between each membrane support element, these baffles consisting either of discs or of concentric cylinders which are staggered so as to force the flow sweeping over the membranes to follow zig-zag paths along radial, axial or even spiral directions.

The apparatus according to the invention has the advantage of being very compact, that is to say it can have a large membrane surface area in a given volume. In fact, firstly, the possibility of coiling tubular membrane supports so as to have diameters not exceeding a few centimetres allows the diameter of the core 4 to be reduced substantially. Secondly, the foam 20 protecting the tubular membranes coiled at the periphery can be reduced to a single sheet. The coiled tubular membranes thus occupty practically the entire internal volume of the apparatus.

Figure 4:
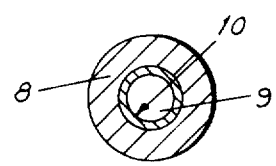
FIG. 4 is, by way of comparison, a cross-section of a coiled tubular membrane support element used in apparatuses of known type.

Furthermore, a comparison of FIGS. 3 and 4 shows clearly that, for a given volume of adjacent tubular membrane support elements of the same diameters, the available membrane surface area is markedly higher when the membrane is positioned outside the support as in the apparatus according to the invention, rather than inside, as in the apparatuses having coiled tubular membranes according to the prior art.

Moreover, the liquid flowing around the membranes can pass through the apparatus at high flow rates, and this liquid can optionally contain solids in suspension. The particular arrangement of the membranes creates hydrodynamic conditions which permit effective operation of the apparatus in the vicinity of the membranes.

The dimensions of the channels 9 inside the membrane support elements can be calculated to permit exactly normal flow of the fluid which has passed through the membranes.

The condition of the membranes can be checked easily, especially on the peripheral elements, and the membranes can be cleaned easily, where appropriate, for example by washing "in situ." Assembling and maintenance of the apparatus can be carried out easily, especially by means of removable coils which can be positioned around a fixed core.

The apparatuses according to the invention make it possible to carry out exchange operations (dialysis, direct osmosis, liquid-gas exchange operations and gas-gas exchange operations), operations involving the separation of fluids (ultrafiltration, reverse osmosis and gas permeation) and even mixing operations. These operations can of course be enriching operations. These apparatuses are of course suitable for exchange applications (such as heat exchange between two fluids, and air humidifying and/or conditioning) or mixing applications (for example, dissolving certain gases in liquids).

EXAMPLE

A reverse osmosis apparatus is constructed according to FIGS. 1 and 2, and comprises a coil of length 13.5 cm and diameter 16 cm, consisting of a core of diameter 5 cm and 9 cords of unit length 20 metres, representing a useful membrane surface area of 1.4 m². Each cord is closed at the end situated on the core side and opens at the other end into a manifold 12 to which it is connected by a sleeve made of silicone elastomer.

Each cord consists of a flexible hollow textilesheath braided from polyethylene yarns, of external diameter 2.5 mm, which has been heat treated according to Belgian Pat. No. 814,953. The membrane is formed "in situ" by depositing a collodion based on cellulose acetate, working in accordance with the technique described in French Pat. Nos. 1,426,548 and 1,506,402.

A 900 l/hour flow of raw water under a pressure of 30 bars is set up inside the apparatus, between the orifices 18 and 19. The pure water which has passed through the membranes by reverse osmosis is collected via the orifice 17.

The following results are obtained, the degree of rejection denoting, as a percentage, the ratio of the amount of salt held back by the membrane to the original amount of salt.

In the case of raw water, the hardness of which corresponds to a hydrotimetric strength of 30°(French scale of hardness), at 20°C under 30 bars, the degree of rejection is 91.2% and the flow rate of pure water is 554 l/m²/day, which demonstrates that the technique described is viable under conditions of industrial use.

By way of comparison, it is possible to stack, in one and the same cylindrical jacket, either 10 coils identical to that used above, thus providing a total surface area of 14.3 m², or a bundle of 684 cords which are identical but are rectilinear, parallel and of unit length 135 cm, which together only provide a membrane surface area equal to 7.3 m². The gain in compactness is thus clearly apparent.

We claim:
1. Fluid fractionating apparatus comprising, in combination:
 a. a jacket;
 b. at least one core within said jacket;
 c. at least one coil comprising at least two continuous porous membrane support elements, each having internally at least one longitudinal channel, each of the at least two continuous support elements being wound uniformly around the at least one core, which thereby acts as a support for the said at least one coil;
 d. a membrane covering each said support element externally within said jacket and being adherent to said at least one support element;
 e. a manifold extending within said jacket and communicating with the exterior of the apparatus and connected in a leakproof manner to the longitudinal channel at at least one end of each said continuous porous membrane support elements; and
 f. a fluid inlet and a fluid outlet for introducing and extracting a fluid to and from said jacket, the said fluid being thus able to flow in the jacket and outside the membrane support elements.

2. Apparatus as claimed in claim 1, in which the manifold is on the outside of the at least one coil and opens into a main channel situated inside the core and communicating with the exterior of the apparatus.

3. Apparatus as claimed in claim 1, in which the manifold is on the surface of each core and communicates with a main channel inside each said core and communicating with the exterior of the apparatus.

4. Apparatus as claimed in claim 1, and further comprising, at the extremities of each core, means by which said coil is held laterally.

5. Apparatus as claimed in claim 4, and further comprising perforated discs situated at the extremities of each core effective to hold each coil laterally.

6. Apparatus as claimed in claim 1 and further comprising a sheath surrounding each coil at its periphery.

7. Apparatus as claimed in claim 1, and further comprising a sealing material which is flexible, elastic and leakproof to fluid, at least partly occupying the space between each coil and the jacket of the apparatus.

8. Apparatus as claimed in claim 1, wherein said tubular membrane support element has one axial channel of a substantially circular cross-section and an external diameter of between 1 to 10 millimetres.

9. Apparatus as claimed in claim 1, and further comprising spacer members between and spacing each adjacent coil porous tubular membrane support element.

10. Fluid fractionating apparatus comprising, in combination:
 a. a jacket;
 b. at least two cores within said jacket and having a main channel therethrough and communicating with the exterior of the apparatus;
 c. at least two coils each comprising at least two continuous porous membrane support elements, each having internally at least one longitudinal channel, each of the at least two continuous support elements being wound uniformly around the at least one core, which thereby acts as a support for the said at least one coil;
 d. a membrane covering each said support element externally and being adherent to said at least one support;
 e. at least two manifolds, one associated with each coil, extending around said cores within said jacket and communicating with the main channel within the associated core and connected in a leakproof manner to the longitudinal channel at at least one end of each said continuous porous membrane support element;
 f. means connecting the main channels of each said core to one another in a leakproof manner; and
 g. fluid inlet and a fluid outlet for introducing and extracting a fluid to and from said jacket, said fluid being thus able to flow in the jacket and outside the membrane support elements.

11. Apparatus as claimed in claim 10, wherein two successive coils have their respective cores aligned along the axis of the apparatus and further comprising a sleeve and suitable sealing means centering said cores.

* * * * *